United States Patent
Lo

(10) Patent No.: US 9,898,367 B2
(45) Date of Patent: Feb. 20, 2018

(54) AUTOMATIC SCANNING AND RECOVERING METHOD FOR ELECTRONIC DEVICE

(71) Applicant: INSYDE SOFTWARE CORP., Taipei (TW)

(72) Inventor: Wen-Hwa Lo, Taipei (TW)

(73) Assignee: INSYDE SOFTWARE CORP., Taipei (TW)

(*) Notice: Subject to any disclaimer, the term of this patent is extended or adjusted under 35 U.S.C. 154(b) by 0 days.

(21) Appl. No.: 14/996,327

(22) Filed: Jan. 15, 2016

(65) Prior Publication Data

US 2016/0224428 A1 Aug. 4, 2016

(30) Foreign Application Priority Data

Feb. 3, 2015 (TW) .............................. 104103544 A

(51) Int. Cl.
*G06F 11/14* (2006.01)

(52) U.S. Cl.
CPC ...... *G06F 11/1441* (2013.01); *G06F 11/1417* (2013.01)

(58) Field of Classification Search
CPC ............. G06F 11/1417; G06F 11/1441; G06F 11/1068; G06F 11/1666; G11C 29/70; G11C 29/838; G11B 20/1883; G11B 20/1889
USPC .............................. 714/14, 22, 6.13; 713/1, 2
See application file for complete search history.

(56) References Cited

U.S. PATENT DOCUMENTS

| 6,189,114 B1* | 2/2001 | Orr ...................... G06F 11/2284 713/2 |
| 6,216,226 B1* | 4/2001 | Agha .................. G06F 11/1417 713/1 |
| 7,181,611 B2* | 2/2007 | Chang ................. G06F 11/0763 713/1 |
| 7,281,160 B2* | 10/2007 | Stewart ............... G06F 11/2087 714/6.13 |
| 7,424,643 B2* | 9/2008 | Atri ...................... G11C 16/225 714/22 |
| 7,555,677 B1* | 6/2009 | Wiley ................. G06F 11/2284 713/1 |
| 8,312,256 B2* | 11/2012 | Anbazhagan ......... G06F 9/4401 713/1 |
| 2016/0062819 A1* | 3/2016 | Oh ..................... G11C 29/4401 714/6.11 |

* cited by examiner

*Primary Examiner* — Joseph R Kudirka
(74) *Attorney, Agent, or Firm* — Muncy, Geissler, Olds & Lowe, P.C.

(57) ABSTRACT

An automatic scanning and recovering method for an electronic device is provided herein and executed by the electronic device. The method comprises following steps: a step of receiving a booting command; a step of determining whether a crash flag is in an activating status when the electronic device is turned on; a step of performing a system diagnostics utility to scan and recover the electronic device when the crash flag is in the activating status; and a step of setting the crash flag to be in an inactivating status and performing a rebooting procedure.

7 Claims, 3 Drawing Sheets

AUTOMATIC SCANNING AND RECOVERING METHOD FOR ELECTRONIC DEVICE

CROSS-REFERENCE TO RELATED APPLICATIONS

This application claims the benefit of Taiwan patent application No. 104103544, filed on Feb. 3, 2015, the disclosure of which is incorporated herein in its entirety by reference.

BACKGROUND OF THE INVENTION

1. Field of the Invention

The present invention relates to a scanning and recovering method, and more particularly relates to an automatic scanning and recovering method after an electronic device crash problem has been solved.

2. Description of Related Art

In a conventional electronic device, such as a personal computer, a laptop, a smart phone, a tablet, etc, and in a process of the electronic device executing software, when the electronic device has hardware defects, the electronic device may fail to proceed with the process. In general, the electronic device may display an abnormal screen to show possible crash reasons as a reference for the technicians to troubleshoot and repair the electronic device.

For a common user of the conventional electronic device, when the abnormal screen is shown on the electronic device, system reboot is a commonly adopted method to overcome the abnormal screen. The electronic device can work properly after rebooting. However, the crash is often caused by the hardware defect of the electronic device itself For example, the hardware defect of the electronic device may be caused by bad sectors of the hard drive. After the abnormal screen is showed on the electronic device, the user has to directly disconnect the power source to shut down the electronic device. Thereafter, the user reconnects the power source to boot the electronic device again.

When the electronic device has not accessed the bad sectors of the hard drive yet, the abnormal screen would not be shown on the electronic device, such that the user may misunderstand that the electronic device can be fixed by rebooting the system.

However, when the user uses some specific software, the electronic device would access the bad sectors of the hard drive. As a result, the abnormal screen would be shown on the electronic device again. Therefore, the user has to reboot the electronic device to use the electronic device, and it is very inconvenient. Besides, the electronic device turned off by disconnecting from the power source will cause deterioration of the electronic device and shorten the lifetime of the electronic device.

SUMMARY OF THE INVENTION

Accordingly, an objective of the present invention is to provide an automatic scanning and recovering method for an electronic device to automatically scan and recover the electronic device from a crash situation last time after the crash problem of the electronic device has been fixed.

The automatic scanning and recovering method for an electronic device is executed by the electronic device and includes steps of:

receiving a booting command;

determining whether a crash flag is in an activating status when the electronic device is turned on;

performing a system diagnostics utility to scan and recover the electronic device when the crash flag is in the activating status; and setting the crash flag to be in an inactivating status and performing a rebooting procedure.

After the electronic device is turned on and before the operating system is loaded, the automatic scanning and recovering method of the present invention is executed in advance. The method of the present invention determines whether the system diagnostics utility is executed to scan and recover the electronic device in accordance with the crash flag. When the crash flag is in the activating status, it represents that the electronic device is not properly shut down last time and the system diagnostics utility is executed. On the contrary, when the crash flag is in the inactivating status, it represents that the electronic device is properly shut down last time and the system diagnostics utility is not required to be executed.

By setting the crash flag, the electronic device can be determined whether the electronic device is shut down properly last time. When the operating system is not shut down properly, the system diagnostics utility automatically executes to scan and recover the electronic device. The users without professional skills who do not understand error information shown on the abnormal screen can have the electronic device repaired by itself so as to avoid the electronic device being frequently shut down for the same reason. The usage convenience is enhanced and the lifetime of the electronic device can be extended.

DETAILED DESCRIPTION OF THE PREFERRED EMBODIMENT

These and other aspects of the embodiments herein will be better appreciated and understood when considered in conjunction with the following description and the accompanying drawings.

Figure 1:
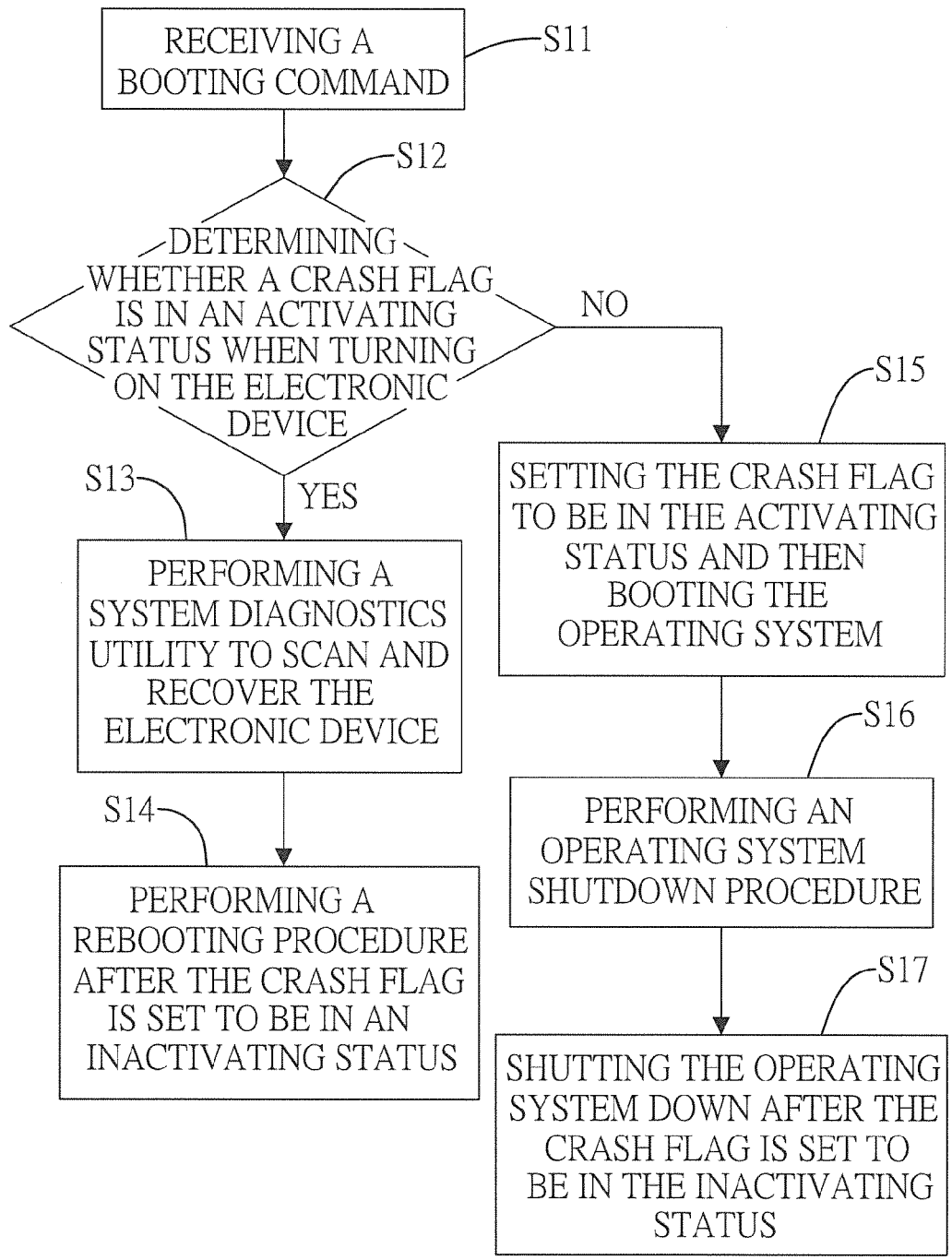
FIG. 1 is a flow chart of an automatic scanning and recovering method for an electronic device in a preferred embodiment of the present invention.

With reference to FIG. 1, the automatic scanning and recovering method for an electronic device in the present invention is performed by the electronic device and the method includes steps of:

receiving a booting command (S11);

determining whether a crash flag is in an activating status when turning on the electronic device (S12);

performing a system diagnostics utility to scan and recover the electronic device when the crash flag is in the activating status (S13); and performing a rebooting procedure after the crash flag is set to be in an inactivating status (S14).

The method in the present invention determines the crash flag in advance after the electronic device is turned on and before loading the operating system. The method will determine that a system diagnostics utility is automatically executed or not in accordance with a determination result. When the crash flag is in the activating status, it represents that the electronic device does not follow a regular procedure to shut down an operating system of the electronic device since the electronic device is crashed and the operating system cannot be shut down properly. Therefore, the system diagnostics utility is performed to scan and recover the electronic device. When the crash flag is in the inactivating status, it represents that the electronic device follows the regular procedure to shut down the operating system of the electronic device. Therefore, the system diagnostics utility is not required to be performed.

The automatic scanning and recovering method for the electronic device further includes the following steps:

setting the crash flag to be in the activating status and then booting the operating system when the crash flag is in the inactivating status (S15);

performing an operating system shutdown procedure (S16);

shutting the operating system down after the crash flag is set to be in the inactivating status (S17).

When the crash flag is in the inactivating status, it represents that the electronic device is shut down in accordance with the operating system shutdown procedure. Therefore, the crash flag is set to be in the activating status in advance and then the operating system is booted to let the user use the electronic device normally.

When a user would like to shut down the operating system of the electronic device, the operating system shutdown procedure is performed via the electronic device so the electronic device normally shuts down the operating system.

At this moment, the crash flag is set to be in the inactivating status by the electronic device. Therefore, the electronic device will execute the automatic scanning and recovering method for the electronic device in the present invention to determine that the operating system has been shut down properly last time, and the operating system is directly loaded for the user to use. However, when the operating system of the electronic device is not shut down by the operating system shutdown procedure, it represents that the abnormal screen was shown on the electronic device because of the crash of the electronic device and the user has to directly disconnect the power source of the electronic device to shut down the operating system. Therefore, the electronic device will skip the step S16 and the step S17, and the crash flag will not be set in the inactivating status. Therefore, when the electronic device is turned on next time, the electronic device will determine the operating system is not shut down properly in accordance with the crash flag. The system diagnostics utility is directly performed to scan and recover the electronic device. After scanning, the rebooting procedure is performed to restart the electronic device.

The following description is to specify the steps in the automatic scanning and recovering method for the electronic device in the present invention. In step S11, the booting command is received. It represents that the user will turn on the electronic device. For example, the user pushes a power button to turn on the electronic device, and a booting command is generated to turn on the electronic device. In step S12, the activating status and the inactivating status in the crash flag respectively represent an abnormal shutdown of the operating system last time and a normal shutdown of the operating system last time. For example, the crash flag is a one-bit data. When the crash flag is 1, it represents that the crash flag is in the activating status and the electronic device does not shut down the operating system properly. On the contrary, when the crash flag is 0, it represents that the crash flag is in the inactivating status and the electronic device shuts down the operating system properly.

In step S13, since the electronic device determined that the operating system is not shut down properly, the electronic device performs the system diagnostics utility to scan and recover the electronic device. In step S14, when the electronic device has been scanned and recovered, the crash flag is set to be in the inactivating status and the rebooting procedure is performed to restart the electronic device. When the electronic device is restarted, the electronic device will repeat the step S12 to determine whether the crash flag is in the activating status or not.

In step S15, when the crash flag is in the inactivating status, it represents that the electronic device is shut down properly last time. And then, the crash flag is set to be in the activating status after booting the operating system. In step S16, after the crash flag is set to be in the activating status, the operating system is booting and the user can use the electronic device normally. In step S17, when the user would like to shut down the operating system of the electronic device, the operating system shutdown procedure is performed by the electronic device and the electronic device normally shuts down the operating system. Before the electronic device performs the operating system shutdown procedure, the crash flag is reset to be in the inactivating status in advance. The crash flag is reset before booting the operating system. It is to avoid that the crash flag still in the activating status to cause the electronic device will automatically perform the diagnosis when the electronic device is turned on next time.

Figure 2:
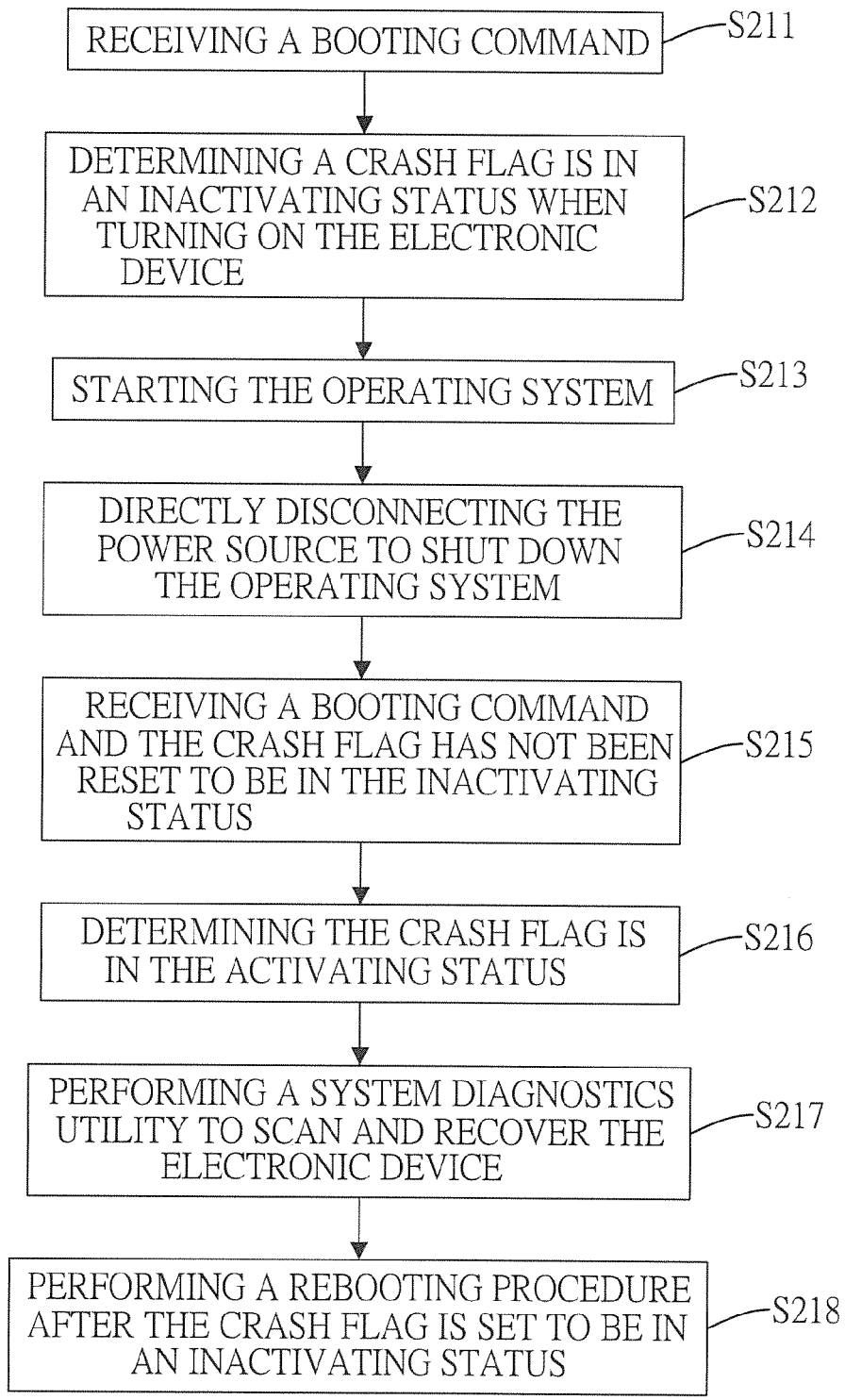
FIG. 2 is a flow chart of the steps when the electronic device is not shut down properly last time.

With reference to FIG. 2, when the electronic device does not perform the operating system procedure to shut down the operating system, it represents that the electronic device does not shut down the operating system properly. Generally, the normal procedure to shut down the operating system is for the user to operate the operating system to execute the shutdown operating system procedure. On the contrary, when the electronic device shows the abnormal screen, the user cannot operate the operating system to shut down the operating system, and the operating system is shut down directly by disconnecting the power source of the electronic device or pushing the power switch of the electronic device. For example, the last time of using the electronic device, the electronic device performs a step S211 and a step S212 in advance. In step S211, a booting command is received. Then, it determines whether a crash flag is in an activating status when turning on the electronic device. After determining the crash flag is in the inactivating status in step S212, step S213 is performed to start the operating system and the user can use the electronic device. When the electronic device is crashed and the operating system cannot be shut down properly, the electronic device will skip the aforementioned step S16 and the aforementioned step S17 and directly disconnect the power source to shut down the operating system in step S214 before the crash flag is set to be in the inactivating status. When the electronic device is turned on next time and the booting command is received in step S215, the crash flag has not been reset to be in the inactivating status because the operating system is not shut down normally last time. In step S216, the crash flag is determined to be in the activating status, and a step S217 and a step S218 are performed. In the step S217, it is to perform a system diagnostics utility to scan and recover the electronic device. In the step S218, it is to perform a rebooting procedure after the crash flag is set to be in an inactivating status.

Figure 3:
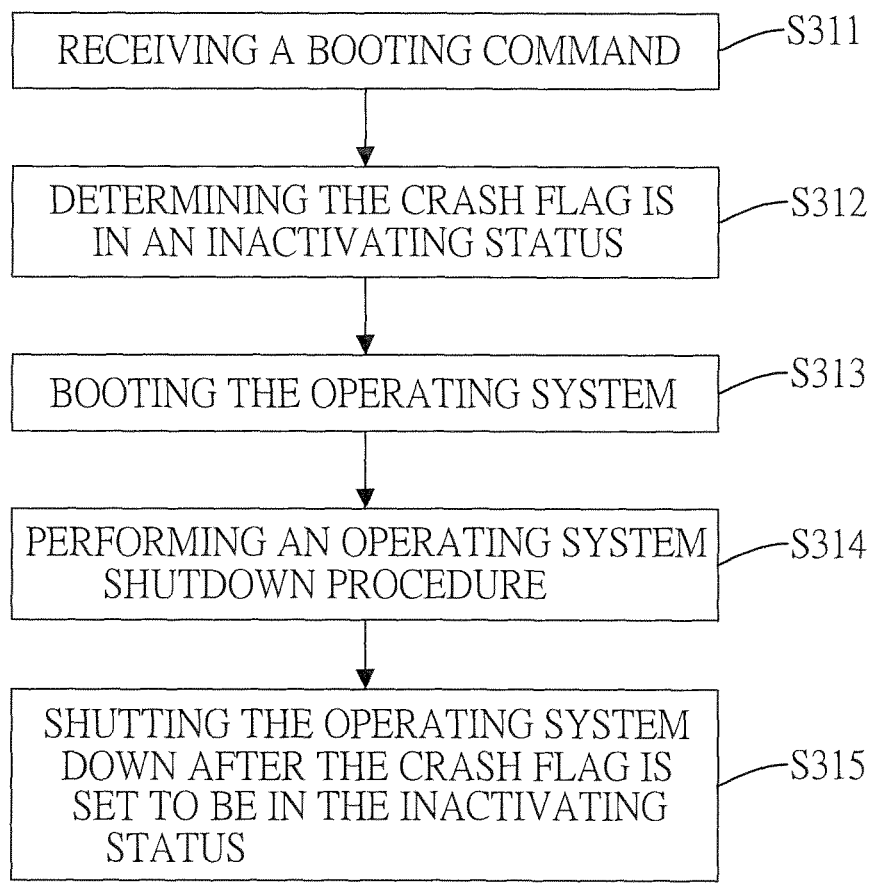
FIG. 3 is a flow chart of the steps when the electronic device is shut down properly last time.

With reference to FIG. 3, after the electronic device normally shuts down the operating system, the electronic device will not automatically perform the system diagnostics utility to scan and recover the electronic device when using the electronic device next time. The operating system is normally booting and the user can use the electronic device regularly. For example, the last time of using the electronic device, the electronic device performs the step S311 and the step S312 in advance. In step S311, a booting command is received. In step S312, it is to determine that the crash flag is in an inactivating status. Thereafter, step S313 is performed, and the operating system is booting to let the user use the electronic device. When the user would like to shut down the operating system, the electronic device will perform a step S314 to shut down the operating system and the crash flag is reset to be in the inactivating status in step S315. When the electronic device is restarted next time and the booting command is received (as the aforementioned step S11), the crash flag has been reset to be in the inactivating status because the operating system is normally shut down last time. And then, in the aforementioned step S12, the crash flag is determined to be in the inactivating status. Thereafter, the aforementioned step S15 is performed, and the user can normally use the electronic device.

Furthermore, as in the aforementioned step S13, the system diagnostics utility is to scan and recover hard drive and memory in the electronic device and isolate bad sectors in the hard drive and the memory in the electronic device to avoid using those bad sectors so as to recover the electronic device. Specifically, a manner to scan and recover the hard drive and the memory of the electronic device is to scan out bad sectors of the hard drive and the memory and isolate the bad sectors of the hard drive and the memory. After the system diagnostics utility scans and recovers the hard drive and the memory of the electronic device, the bad sectors in the hard drive and the memory are isolated to avoid other programs or software using the bad sectors and causing the abnormal screen, and the electronic device is recovered.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. An automatic scanning and recovering method for an electronic device, and the automatic scanning and recovering method executed by the electronic device and including steps of:
   receiving a booting command;
   determining whether a crash flag is in an activating status when the electronic device is turned on;
   when the crash flag is in an inactivating status, setting the crash flag to be in the activating status and thereafter booting an operating system installed on the electronic device with the crash flag being in the activating status, performing an operating system shutdown procedure, and shutting down the operating system after the crash flag is set to be in the inactivating status;
   performing a system diagnostics utility to scan and recover the electronic device when the crash flag is in the activating status; and
   setting the crash flag to be in the inactivating status and performing a rebooting procedure.

2. The method as claimed in claim 1, wherein the step of scanning and recovering the electronic device is to scan and recover a hard drive of the electronic device via the system diagnostics utility.

3. The method as claimed in claim 2, wherein the system diagnostics utility scans out bad sectors of the hard drive and isolates the bad sectors of the hard drive to recover the hard drive.

4. The method as claimed in claim 2, wherein the step of scanning and recovering the memory electronic device is to scan and recover a memory of the electronic device.

5. The method as claimed in claim 4, wherein a manner to scan and recover the memory of the electronic device is to scan out bad sectors of the memory and isolate the bad sectors of the memory.

6. The method as claimed in claim 1, wherein the step of scanning and recovering the electronic device is to scan and recover a memory of the electronic device.

7. The method as claimed in claim 6, wherein a manner to scan and recover the memory of the electronic device is to scan out bad sectors of the memory and isolate the bad sectors of the memory.

* * * * *